United States Patent [19]

Wintersdorff et al.

[11] 4,019,699
[45] Apr. 26, 1977

[54] AIRCRAFT OF LOW OBSERVABILITY

[75] Inventors: Robert W. Wintersdorff, San Diego; George R. Cota, La Jolla, both of Calif.

[73] Assignee: Teledyne Ryan Aeronautical a Division of Teledyne Industries, Inc., San Diego, Calif.

[22] Filed: July 21, 1975

[21] Appl. No.: 597,969

Related U.S. Application Data

[63] Continuation of Ser. No. 465,540, April 30, 1974, abandoned.

[52] U.S. Cl. .................................. 244/121; 244/15; 244/36; 343/18 A; 343/18 E
[51] Int. Cl.[2] .......................................... B64D 7/00
[58] Field of Search ............... 244/121, 36, 15, 13, 244/12 C, 12 R, 23 C, 23 R; 343/18 A, 18 B, 18 E

[56] References Cited

UNITED STATES PATENTS

| | | | |
|---|---|---|---|
| 2,619,302 | 11/1952 | Loedding | 244/36 X |
| 2,650,780 | 9/1953 | Northrop et al. | 244/36 X |
| 3,018,987 | 1/1962 | Multhopp | 244/15 X |
| 3,325,808 | 6/1967 | Manning | 343/18 A |
| 3,487,410 | 12/1969 | Barnett et al. | 343/18 A |
| 3,509,568 | 4/1970 | Manning et al. | 343/18 A |
| 3,576,300 | 4/1971 | Palfreyman | 244/36 |
| 3,599,210 | 8/1971 | Stander | 343/18 A |
| 3,625,459 | 12/1971 | Brown | 244/36 X |
| 3,662,387 | 5/1972 | Grimes | 343/18 A |
| 3,713,157 | 1/1973 | August | 343/18 A |

*Primary Examiner*—Trygve M. Blix
*Assistant Examiner*—Barry L. Kelmachter
*Attorney, Agent, or Firm*—Brown & Martin

[57] ABSTRACT

An aircraft which has a very low observability visually and to radar, thermal and acoustic detecting devices. The aircraft is designed to have as few edges and surfaces as possible, such as a delta wing type, the edges being straight, or near straight and the vertices rounded. All surfaces are as near flat as possible, within the limits of aerodynamic requirements, and the entire surface of the aircraft is electrically conductive with minimum discontinuity. The propulsion unit is faired into and shielded from radar by the wing. Portions of the aircraft, particularly edges, may be of radar absorbing material, and any essential openings, ducts or protruding fins are similarly shielded to minimize the radar cross section.

5 Claims, 18 Drawing Figures

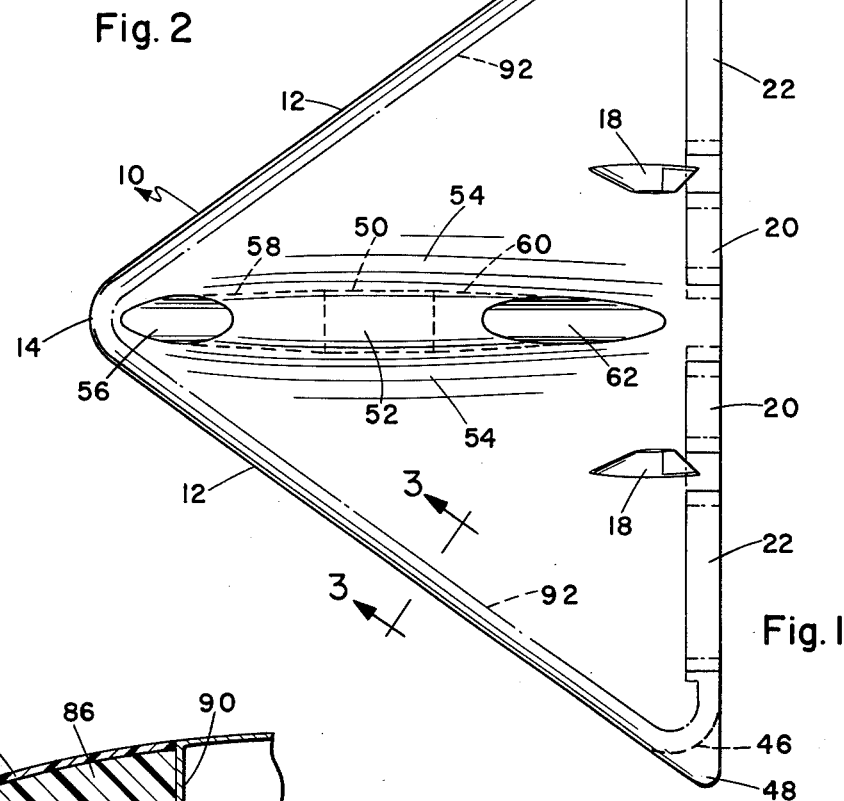
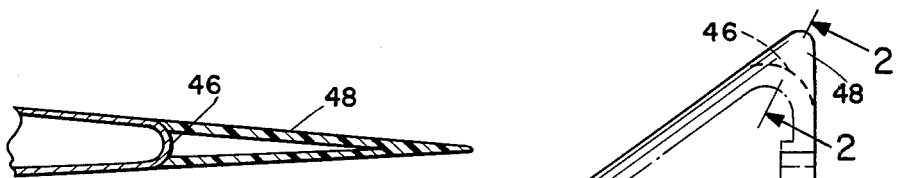
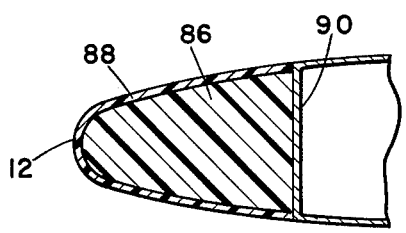
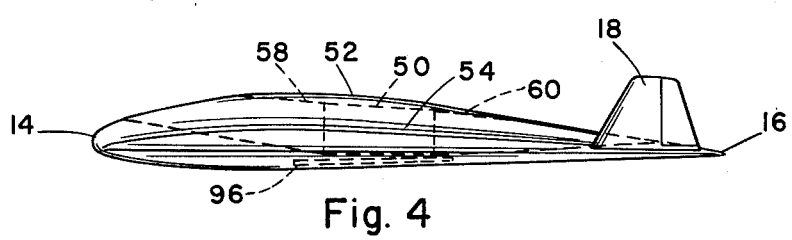
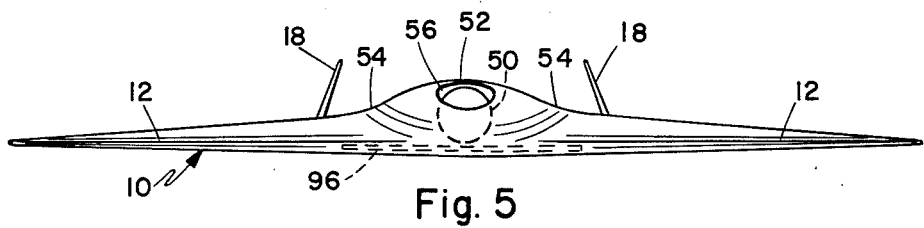

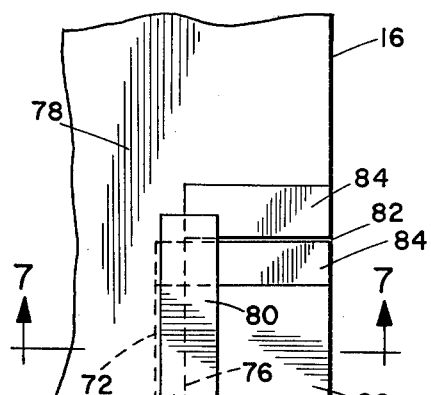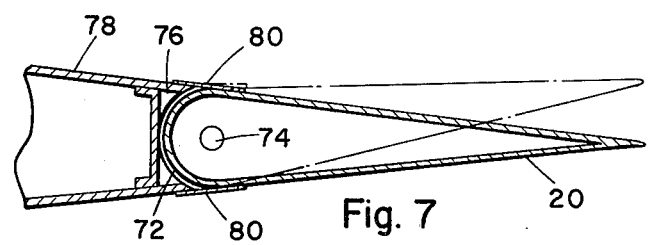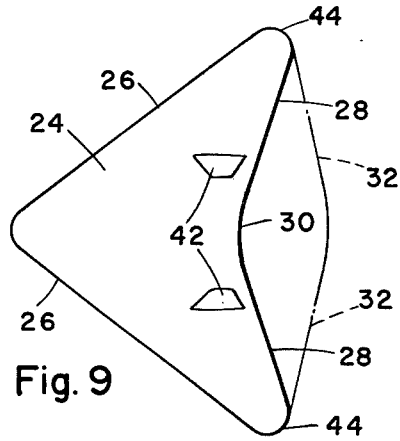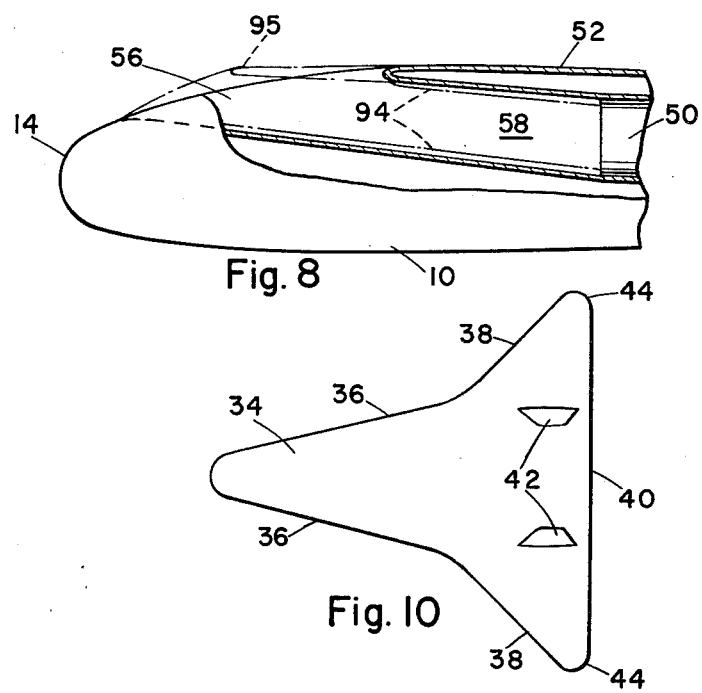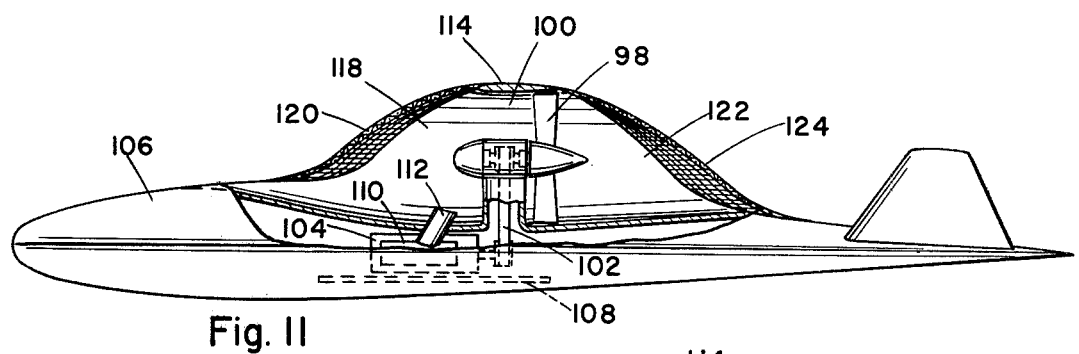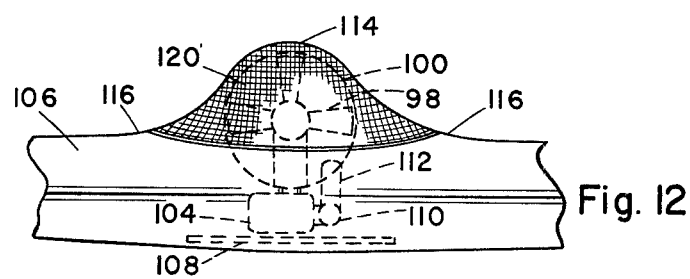

AIRCRAFT OF LOW OBSERVABILITY

This is a continuation of application Ser. No. 465,540, filed Apr. 30, 1974, now abandoned.

BACKGROUND OF THE INVENTION

When aircraft are used for covert purposes, such as for reconnaisance, weapons delivery and the like, some form of camouflage is desirable to avoid detection. Defense systems involving radar, thermal and acoustic detection means in various combinations have made it difficult to make aircraft undetectable. Radar has the longest range and most versatility of the detection devices and is therefore of prime consideration. Decoys can be used, but must be carried by the aircraft and are only temporary.

Various techniques have been developed to minimize detection of aircraft, such as by using non-metallic materials for large portions of the structure. However, this structure is transparent to radar and all internal metal structure, such as the propulsion means, electrical components and the like, provide readily recognizable return signals to radar. Certain materials have been developed which effectively absorb radar energy, but are limited in structural use. In conventional air craft design there are many different surfaces and edges which produce radar signatures that are recognizable as being from an aircraft. In addition, other devices are capable of detecting thermal and acoustic energy from the aircraft's propulsion system. To avoid detection, all such sources of energy emission must be shielded and the airframe must be adapted to minimize the radar cross section.

SUMMARY OF THE INVENTION

The aircraft described herein has a radar cross section on the order of 1% of that of a conventional aircraft designed for the same purposes. This is accomplished by eliminating the usual fuselage and tail surfaces and making the aircraft a flying wing of general delta configuration, with the leading and trailing edges straight or near straight. The surfaces of the wing are as flat as possible, within the limits of aerodynamic requirements, and surface discontinuities are minimized. Radar return from such a structure is little more than a specular flash, which would not normally attract attention. Various types of paint or other finishes may be applied over the metallic surfaces to reduce optical visibility.

To further improve the effect, protruding control surfaces such as fins and rudders are mounted on top of the wing inboard of the edges and are inclined toward the center line to offer minimum side area to upwardly directed radar. The propulsion means is recessed as much as possible into the upper portion of the wing at the center line for maximum shielding, and can be thermally and acoustically shielded by internal structure. Any air conducting ducts for the propulsion system are kept as low as possible and, if protruding, are smoothly blended into the wing contours by large radius fairings. Radar and acoustic shielding may be used in any ducts which may be exposed to detection devices. Thermal output from the propulsion means is exhausted above the wing and, if possible, diffused to minimize emissions.

Radar cross section is further reduced by rounding the vertices of the delta wing to eliminate sharp points. If certain tip shapes are needed for aerodynamic purposes, these can be formed by extensions of radar transparent material. Radar absorbing material can also be used in edge portions of the wing and at control surface gaps. Certain gaps at movable control surfaces are covered by flexible shrouds to minimize discontinuity in the surface. Various combinations of the above mentioned features may be used, depending on the particular mission of the aircraft and the degree of shielding required.

The primary object of this invention, therefore, is to provide a new and improved aircraft of low observability.

Another object of this invention is to provide an aircraft in which the configuration of an all wing structure has a minimum radar cross section due to specific shaping of its surfaces and edges.

Another object of this invention is to provide an aircraft in which all normally protruding elements are recessed in or shielded by the wing structure from detection sources.

Another object of this invention is to provide an aircraft having low detectability to radar, optical, thermal and acoustic devices.

A further object of this invention is to provide an aircraft which is adaptable to a variety of mission and performance requirements, in which low observability is essential.

Other objects and advantages will be apparent in the following detailed description, taken in conjunction with the accompanying drawings, in which:

FIG. 1 is a top plan view of a typical aircraft incorporating the low observability features.

FIG. 2 is an enlarged sectional view taken on line 2—2 of FIG. 1.

FIG. 3 is an enlarged sectional view taken on line 3—3 of FIG. 1.

FIG. 4 is a side elevation view of the aircraft.

FIG. 5 is a front view of the aircraft.

FIG. 6 is an enlarged top view of a typical control surface joint.

FIG. 7 is an enlarged sectional view taken on line 7—7 of FIG. 6.

FIG. 8 is an enlarged side view of the nose portion of the aircraft, cut away to show the intake duct.

FIG. 9 is a diagrammatic top plan view of an alternative aircraft shape.

FIG. 10 is a top plan view of a further alternative aircraft shape.

FIG. 11 is a side elevation view of an aircraft, cut away to show a ducted fan propulsion system.

FIG. 12 is a partial front view of the aircraft of FIG. 11.

DESCRIPTION OF THE PREFERRED EMBODIMENT

Figure 13:
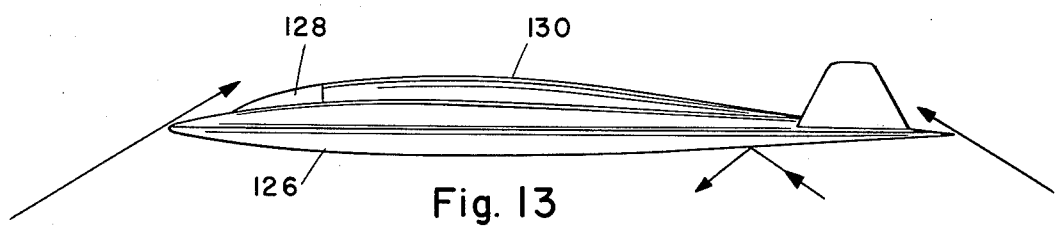
FIG. 13 is a side view of an aircraft, illustrating the exposure to radar.

The aircraft 10, illustrated in FIGS. 1–5, is typical and is of simple delta wing configuration. The wing has straight leading edges 12 swept back from a rounded nose 14, and a straight trailing edge 16. On top of the wing are inboard mounted fins 28, which are inclined inwardly toward the longitudinal center line. Inset in the trailing edge 16 are movable control surfaces 20 and 22, the particular arrangement depending on the degree of control required.

It should be understood that the delta configuration can vary considerably in aspect ratio, sweep angles and other features, to suit specific performance and mission requirements. Another example is illustrated in FIG. 9, in which the wing 24 has swept back leading edges 26 and swept back trailing edges 28 joined at the center by a smoothly curved portion 30. Alternatively, the wing 24 could have swept forward trailing edges 32, as indicated in broken line. The double delta type wing 34 shown in FIG. 10 has sharply swept back forward leading edges 36, less sharply swept rear leading edges 38 and a straight trailing edge 40. In each instance the wing has inclined inboard fins 42 and rounded wing tips 44.

The rounded wing tips 46 indicated in dash line in FIG. 1, represent the tips of the basic wing structure. Extended tips 48, if necessary for aerodynamic reasons, are of plastic or other radar transparent material, as in FIG. 2, the reason for which is hereinafter described.

The propulsion system is illustrated as being a turbojet engine 50 recessed in the upper surface of the wing and enclosed in a low profile cowling 52, which is blended smoothly into the wing contours by large radius fairings 54. The wing has an inlet opening 56 in the forward upper surface, with an inlet duct 58 leading to engine 50. An exhaust duct 60 leads from the engine to an upper outlet opening 62 well forward of trailing edge 16.

Figure 16:
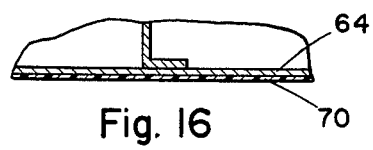
FIG. 16 is an enlarged sectional view of a typical surface skin structure of the aircraft.
Figure 17:
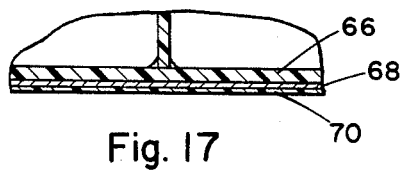
FIG. 17 is an enlarged sectional view of an alternative skin structure.

To minimize the radar cross section of the aircraft, the surface is electrically conductive with minimum discontinuity and a smooth finish. This may be accomplished by using a metallic structure, as typified by surface skin 64 in FIG. 16, or by a nonmetallic or composite structure 66 with an outer metallic coating 68, as in FIG. 17. Since the outer surface is reflective, there are very few restrictions on the type of internal structure and components which can be used. In either arrangement, an outer coating 70 of nonconductive paint or similar material may be applied for visual camouflage and protection.

The straight leading and trailing edges provide only specular reflection of normal incident radiation and deflect non-normal incident radiation away from the source. Some curvature in the edges can be tolerated for structural or aerodynamic reasons, but preferably no less than 3 meters in radius. In lateral cross section the edges can be of conventional airfoil configuration, but the skin surfaces are generally as flat as possible within the limits of aerodynamic requirements. The tips 46 have a radius in planform between 25% and 40% of the wavelength of the lowest radar frequency expected to be encountered, the fairings 54 and cowling 52 being similarly radiused in cross section. This radius minimizes back scattering of non-normal incident radiation due to travelling and creeping waves. A smooth surface finish will also reduce scintillation from any portion of the surface.

Since any discontinuity in the conductive surface will cause an unwanted bloom in the radar cross section, the control surface joints must be shielded, as in FIGS. 6 and 7. The leading edge or nose portion 72 of control surface 20 forward of hinge 74, is recessed into a concave shroud 76 in the rear of the fixed wing structure 78. The remaining small gaps are covered by flexible shroud extensions 80 of conductive material, which are secured to the fixed structure 78 and lie against the faces of the control surface. When the control surface is deflected, as indicated in the broken line position, the shroud extensions flex as necessary. Other gaps around non-moving structure, such as access doors and panels, can be sealed with metallized adhesive tape before flight for maximum shielding effect. Spanwise gaps between control surfaces and fixed structure, as typified by gap 82 in FIG. 6, may be shielded by incorporating radar absorbing material 84 into the adjoining end portions of the structure.

For further reduction of radar cross section, peripheral portions of the wing, such as the leading edges, may be shaped from radar absorbing material 86 encased in a rigid skin 88 of dielectric material, as used in radome construction. This structure is secured to the metal leading edge structure 90 in any suitable manner, as in FIG. 3, and conforms to the aerodynamic contours as part of the basic structure. A typical extent of the radar absorbing edge structure is indicated by broken line 92 in FIG. 1.

Fins 18 are in the geometric shadow of the wing as seen from below and present a small target from the rear. The fins may be of metallic structure or, if no internal metallic components are used, may be of radar transparent material.

Inlet duct 58 is preferably as flush as possible in the wing and can, if necessary have a lining 94 of radar and/or acoustically absorbent material. Exhaust duct 60 can be similarly treated and may also be provided with thermal insulation. If the forward end of the duct must have an extended lip for aerodynamic purposes to ensure proper airflow, the lip 95 may be of radar transparent material. For additional protection a thermal and acoustic shield 96 is installed in the wing below engine 50, various techniques for this being well known.

A configuration for small aircraft is illustrated in FIGS. 11 and 12, in which the wing can be of any planform thus far described. The propulsion system is of the ducted fan type, with a propeller or fan 98 mounted in a duct 100 and driven by a belt 102 from a small internal combustion engine 104. The engine is recessed in the wing 106 and a thermal and acoustic shield 108 is installed below the engine. A muffler 110 is used to minimize noise and the exhaust pipe 112 open upwardly into duct 100, to mix the hot gases with the cold air flow and dissipate exhaust heat. The duct is recessed into the wing as far as possible to reduce the height of the cowling 114 over the duct. The front, rear and sides of the cowling 114 are extended to blend smoothly into the wing contour with large radius fairings 116. To avoid reflections of low angle radar from the fan and the internal structure in the duct, the duct inlet 118 is covered by a shield 120 and the outlet 122 is covered by a shield 124. The shields are of conductive wire mesh which will pass sufficient airflow for propulsion, but will present an apparently continuous conductive surface to radar. For maximum effect the shields are curved to conform to the faired contours of the duct cowling and wing. As an alternative to the screen material, egg crate type shields of radar absorbing materials could be used.

Figure 14:
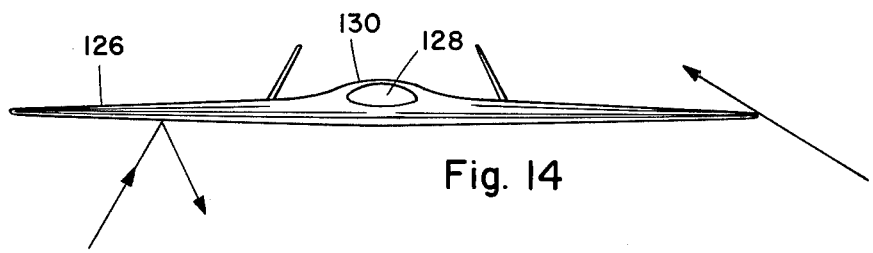
FIG. 14 is a front view of the aircraft with radar beams indicated.

The aircraft is adaptable to manned or unmanned configuration for a variety of missions at all altitudes. The aircraft 126 illustrated in FIGS. 13 and 14 has a cockpit canopy 128 incorporated in the forward portion of the propulsion system cowling 130. The canopy is preferably coated with a thin film of noble metal such as gold, with a resistance on the order of 100 ohms per square meter. As illustrated, the canopy is shielded by the aircraft nose from low angle radar, indicated by directional arrows. The near flat underside of the wing deflects all but normal incident energy away from the source.

Figure 15:
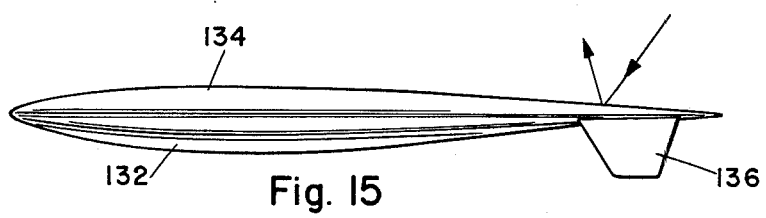
FIG. 15 is a side view of an aircraft adapted to low altitude flight and shielded from radar originating from above.

For some purposes an aircraft may be required to fly very low in an area where ground based detection system are sparse or non-existent. Since the primary threat would then be from aircraft with a look-down capability of detecting a target against ground clutter, the aircraft could be as illustrated in FIG. 15. In this configuration the propulsion system is in an enclosure 132 below the wing 134, and fins 136 are also below the rear portion of the wing. The upper surface is then a near flat conductive shield for the aircraft.

Figure 18:
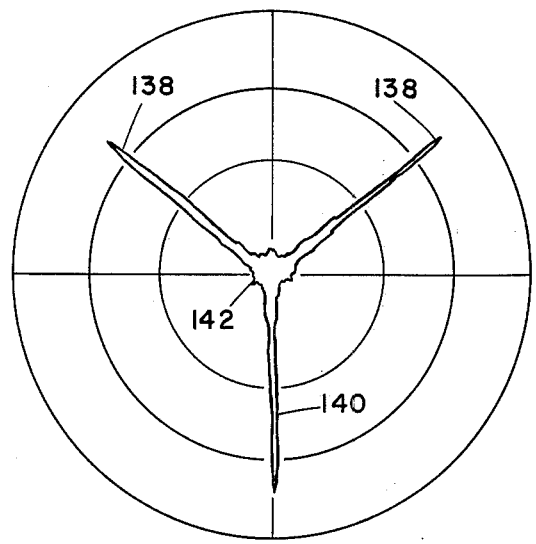
FIG. 18 is a polar graph of a typical radar cross section signature of the aircraft of FIG. 1.

Normally it is not necessary to protect an aircraft against all possible radar frequencies for every type of mission, although the aircraft described above is capable of such a possibility. By using a suitable combination of the above described features, an aircraft can be given a good chance of survival in a particular mission where general knowledge of the defenses exists. In many cases, however, it will be necessary to compromise between low observability and aerodynamic and performance requirements. Tests have shown that such an aircraft can have a radar cross section of as little as 1% of that of a conventional type of aircraft in the same performance class. A typical polar graph of the radar cross section is shown in FIG. 18. Two forwardly extending specular spikes 138 are from the leading edges and a spike 140 is from the trailing edge of the aircraft. Blooming 142 at the center is minimal. A radar return from such a target would be no more than a momentary flicker, similar to that from a bird or other insignificant object.

Having described our invention, we now claim:

1. An aircraft of low observability, comprising:
   a wing having a nose portion, swept back leading edges extending from the nose portion, and a trailing edge, major portions of the edges being substantially straight in planform;
   said wing having upper and lower surfaces, major portions of which are substantially flat;
   the wing having rounded tips blending tangentially into said leading and trailing edges and having a radius of at least one quarter wavelength of the lowest frequency radar expected to be encountered;
   extended aerodynamic tips of radar transparent material fixed to said rounded tips;
   and all surfaces of the wing having substantially continuous electrical conductivity.

2. An aircraft of low observability, comprising:
   a wing having a nose portion, swept back leading edges extending from the nose portion, and a trailing edge, major portions of the edges being substantially straight in planform;
   said wing having upper and lower surfaces, major portions of which are substantially flat;
   the wing having rounded tips blending tangentially into said leading and trailing edges;
   said trailing edge having hinged aerodynamic control surfaces therein, and electrically conductive, gap covering, flexible shroud elements extending between said control surfaces and the adjacent wing structure;
   and all surfaces of the wing having substantially continuous electrical conductivity.

3. An aircraft according to claim 2, wherein the spanwise ends of said control surface and the adjacent wing structure contain radar absorbent material.

4. An aircraft of low observability, comprising:
   a wing having a nose portion, swept back leading edges extending from the nose portion, and a trailing edge, major portions of the edges being substantially straight in planform;
   said wing having upper and lower surfaces, major portions of which are substantially flat;
   the wing having rounded tips blending tangentially into said leading and trailing edges;
   all surfaces of the wing having substantially continuous electrical conductivity;
   and a pilot enclosing canopy on the wing, said canopy having a substantially transparent electrically conductive coating thereon continuous with the conductivity surface of the wing.

5. An aircraft of low observability, comprising:
   a wing having a nose portion, swept back leading edges extending from the nose portion, and a trailing edge, major portions of the edges being substantially straight in planform;
   said wing having upper and lower surfaces, major portions of which are substantially flat;
   the wing having rounded tips blending tangentially into said leading and trailing edges;
   all surfaces of the wing having substantially continuous electrical conductivity;
   ducted fan propulsion means having an air duct partially recessed into one surface of the wing, with inlet and outlet portions inset from the edges of the wing, and a driven fan rotatably mounted in the duct;
   said duct having smoothly curved fairing structure blending the duct into the wing contours, the inlet and outlet portions of the duct having air conducting radar shielding screens substantially continuous in curvature with the fairing structure and wing contours, and conductively continuous with the wing surface.

* * * * *